US007029054B2

(12) United States Patent
Kobayashi et al.

(10) Patent No.: US 7,029,054 B2
(45) Date of Patent: Apr. 18, 2006

(54) OUTSIDE HANDLE DEVICE

(75) Inventors: Norikazu Kobayashi, Chita (JP); Koichi Hirota, Takahama (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/765,888

(22) Filed: Jan. 29, 2004

(65) Prior Publication Data

US 2004/0251709 A1 Dec. 16, 2004

(30) Foreign Application Priority Data

Jan. 29, 2003 (JP) ............................ 2003-021088

(51) Int. Cl.
*B60J 9/00* (2006.01)
*B60J 5/04* (2006.01)

(52) U.S. Cl. .................................. 296/146.1; 296/1.02

(58) Field of Classification Search ............ 296/146.1, 296/152, 146.4, 146.9, 1.02; 362/501; 16/412; 49/502, 503; 292/336.3, DIG. 23, DIG. 30, 292/DIG. 53

See application file for complete search history.

(56) References Cited

U.S. PATENT DOCUMENTS 4,475,754 A * 10/1984 Arlauskas et al. ....... 292/336.3
5,685,581 A * 11/1997 Kritzler et al. .......... 292/336.3
5,791,703 A 8/1998 Kritzler et al.
6,234,548 B1 * 5/2001 Mittelbach et al. ...... 292/336.3
6,363,577 B1 4/2002 Spitzley
6,439,626 B1 * 8/2002 Rohlfing ...................... 16/412
6,447,030 B1 9/2002 Meinke
6,543,090 B1 * 4/2003 Muneta ....................... 16/412
6,565,134 B1 * 5/2003 Stuart et al. ............ 292/336.3
6,594,861 B1 * 7/2003 Dimig et al. ................. 16/412
6,648,493 B1 * 11/2003 Klein ......................... 362/501
6,672,633 B1 * 1/2004 Nomura et al. .......... 292/336.3
6,719,336 B1 * 4/2004 Sato ........................ 292/336.3
6,779,372 B1 * 8/2004 Arlt et al. ...................... 70/237
6,847,289 B1 * 1/2005 Pang et al. ............ 340/426.28
6,848,818 B1 * 2/2005 Huizenga .................... 362/501
6,854,870 B1 * 2/2005 Huizenga .................... 362/501
2002/0089194 A1 7/2002 Nomura et al.

FOREIGN PATENT DOCUMENTS

EP 1108835 A2 6/2001
JP 2002-30844 A 1/2002

* cited by examiner

*Primary Examiner*—H. Gutman
(74) *Attorney, Agent, or Firm*—Buchanan Ingersoll PC

(57) ABSTRACT

An outside handle device includes a handle portion provided at the outside of a vehicle door, a handle frame fixed to the vehicle door and supporting the handle portion via an arm portion provided on the handle portion. The arm portion is provided with an engaging means, and the handle frame is provided with an engaged means which designates an assembling direction of the arm portion by engaging with the engaging means.

8 Claims, 7 Drawing Sheets

OUTSIDE HANDLE DEVICE

FIELD OF THE INVENTION

This invention generally relates to an outside handle device and more particularly to an outside handle device for a vehicle door.

BACKGROUND OF THE INVENTION

Recently, an electrically operated door locking device and a wireless remote control door locking device are employed in a vehicle door so as to enhance convenience for opening and closing a vehicle door. In an outside handle device included in such system, electrical components are located and accommodated in a handle portion assembled at the outside of the vehicle door. Therefore, the electrical components of the handle portion are electrically connected to electrical wire of the vehicle body side by using various manners.

For example, a known outside handle device is disclosed in Japanese Patent Laid-Open Publication published on Jan. 31, 2002 as the publication number JP2002-30844.

In the disclosed outside handle device, the electrical components of the handle portion are electrically connected to electrical wire of the vehicle body side via a wire harness (a electrical wire) and a connector.

According to the disclosed outside handle, however, when the electrical components of the handle portion are connected to the wire harness of the vehicle body side after the handle portion is assembled to the vehicle door, electrical components of the handle portion have to be connected to the wire harness of the vehicle body side in a space provided in the vehicle door, which takes more time to completely assemble the handle portion to the vehicle door. Especially in such connecting operation between electrical components of the handle portion and the wire harness of the vehicle body side, the handle portion is assembled to a predetermined position in the vehicle door side in advance, so that the handle portion can be assembled to the predetermined position so as to simplify assembling operation. Further, the wire harness (electrical wire) has to be provided so as not to interfere with a door window provided in the vehicle door, then it takes more time to properly design arrangement of various parts (i.e. the handle portion, door window) included in the vehicle door.

In order to simplify the assembling operation of the handle portion to the door, a known outside handle device disclosed in European Patent No. 1108835(FIG. 2) published on Jun. 20, 2001 includes a handle portion integrally provided with a connector structure. Consequently, an electrical wire of a handle side is electrically connected to an electrical wire of the vehicle body side in response to assembling operation of the handle portion.

However when the electrical wire of the handle side is electrically connected to the electrical wire of the vehicle body side, the handle portion must be a fixed type. Design allowance in outside handle device is restricted.

A need thus exists to provide an outside handle device which can simplify the assembling operation without design restriction.;

SUMMARY OF THE INVENTION

According to an aspect of the present invention, an outside handle device includes a handle portion provided at the outside of a vehicle door and a handle frame fixed to the vehicle door and supporting the handle portion via an arm portion provided on the handle portion. The arm portion is provided with an engaging means and the handle frame is provided with an engaged means which designates an assembling direction of the arm portion by engaging with the engaging means.

According to another aspect of the present invention, the engaging means and the engaged means respectively correspond to a protrusion and a groove which guides the protrusion, and the engaging means and the engaged means respectively correspond to a groove and a protrusion.

According to still another aspect of the present invention, an electrical component is accommodated in the handle portion. The arm portion is rotatably provided with a first connecting portion electrically connected to the electrical component accommodated in the handle portion. The handle frame is provided with a second connecting portion electrically connected to the first connecting portion by engaging with the first connecting portion.

According to still further aspect of the present invention, the first connecting portion is provided on the arm portion so as to be surrounded by an internal surface of the arm portion.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Hereinafter, a preferred embodiment of the present invention will be described with reference to the accompanying drawings.

Figure 9:
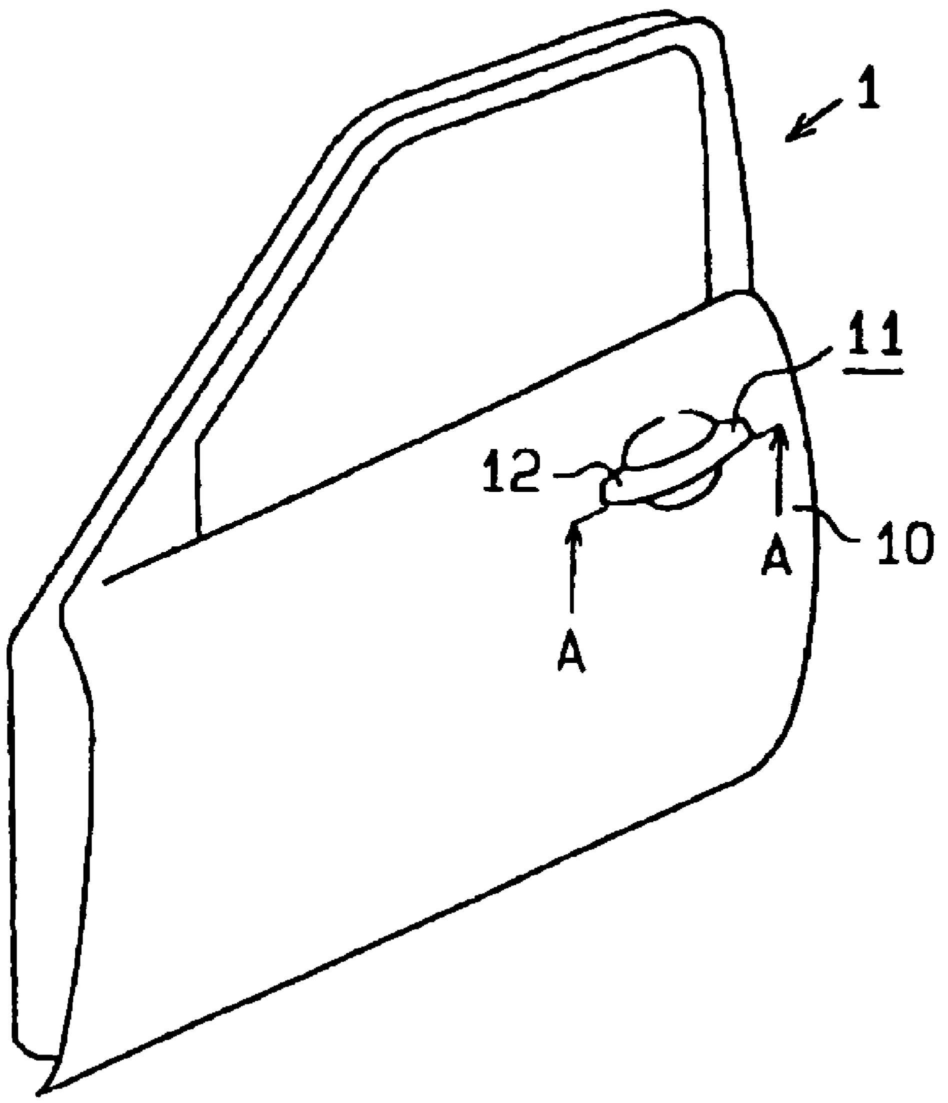
FIG. 9 shows a perspective view of a vehicle door to which the outside handle of the present invention is adopted.

As illustrated in FIG. 9, an outside handle 11 is provided on a vehicle door 1. The outside handle 11 is provided at the rear side of a vehicle of a door outer panel 10 with the handle portion 12 projecting toward the outside of the vehicle. The door outer panel 10 forms an outer shape or profile of the vehicle door 1. The handle portion 12 is a member, which is gripped by a driver of the vehicle when the vehicle door 1 is mechanically opened and closed.

Figure 3:
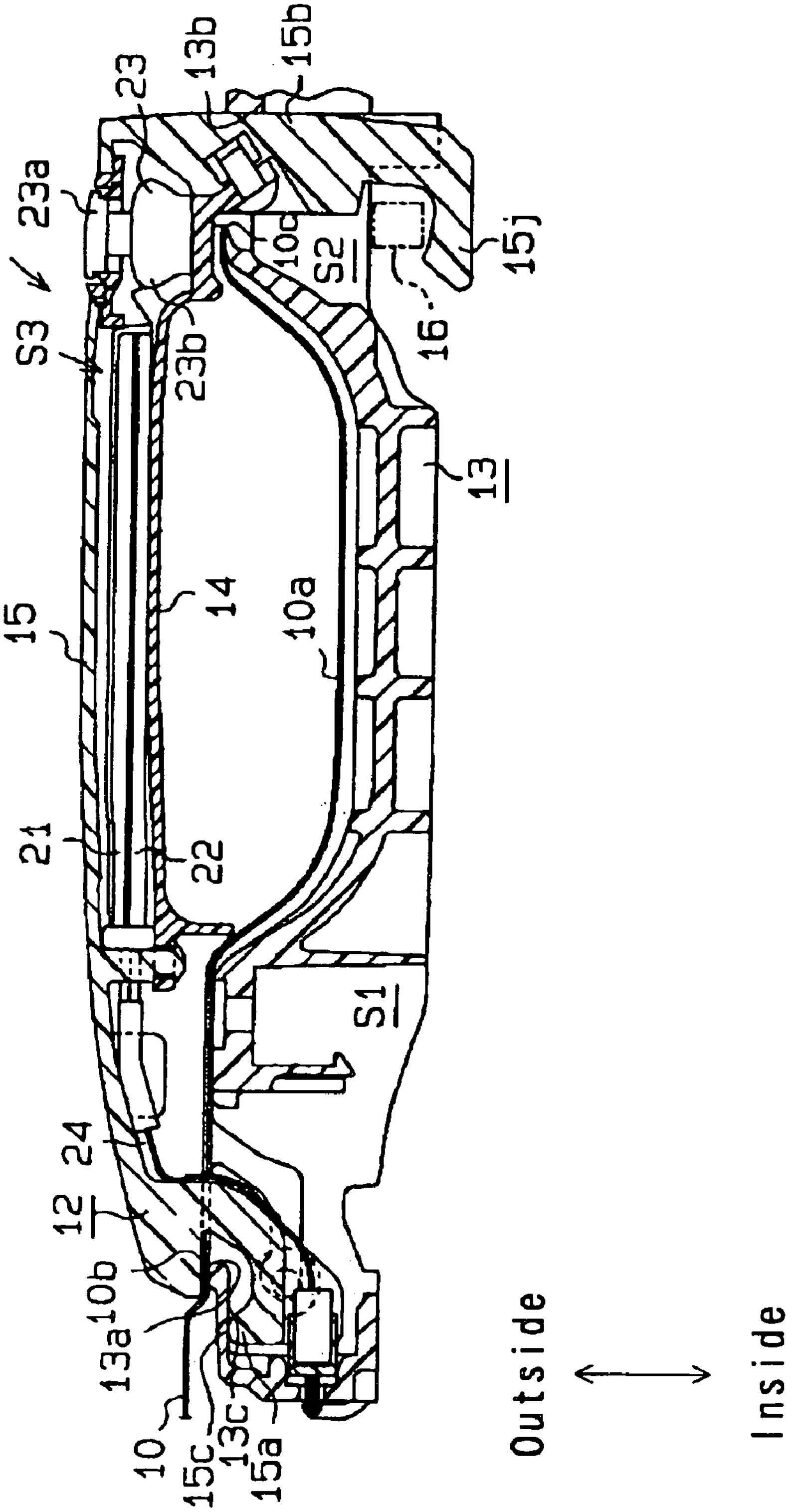
FIG. 3 shows a cross sectional view of the outside handle as a whole taken along the section line A—A in FIG. 9.

As illustrated in FIG. 3, the outside handle 11 is provided with the handle portion 12 and a handle frame 13. The handle portion 12 and the handle frame 13 are respectively provided at the outside and inside relative to the handle 10. The handle frame 13 is fastened to the door outer panel 10, and the handle portion 12 is pivotally connected to the handle frame 13 within a predetermined range.

Specifically, the door outer panel 10 has a bended portion 10*a* curving toward the inside and handle opening portions 10*b* and 10*c* are respectively provided on the door outer panel 10 at the each side respectively. An arm portion of the handle portion 12 is inserted in the handle opening portions 10*b* and 10*c* (the left and right sides in FIG. 3). A handle frame 13 made of resin has an approximately square shaped inside structure and is formed along the bended portion 10*a* of the door outer panel 10. The handle frame 13 is provided with two frame-side handle opening portions 13*a* and 13*b* which are respectively opened corresponding to the handle opening portions 10*b* and 10*c*. The handle frame 13 is respectively provided with a first internal space Si and a second internal space S2 corresponding to the frame-side handle opening portions 13*a* and 13*b* respectively.

On the other hand, the handle portion 12 includes a handle base 14 and a handle cover 15. The handle cover 15 is provided on the handle base 14 so as to cover the handle base 14. The handle base 14 and the handle cover 15 made of resin form an outer shape or profile of the handle portion 12. The handle cover 15 is provided with a hinge arm (arm portion) portion 15*a* and a stroke arm portion 15*b* at one side (the left side in FIG. 3, forward of the vehicle) and the other side (the right side in FIG. 3, rear of the vehicle) respectively.

The hinge arm portion 15*a* is inserted in the handle opening portion 10*b* and the frame-side handle opening portion 13*a*. A convex portion 15*c* forming the edge of the hinge arm portion 15*a* is in contact with a cover wall portion 13*c* of the handle frame 13 including the frame-side handle opening portion 13*a*. The handle portion 12 (the handle cover 15) is pivotally connected to the handle frame 13 with respect to a point where the convex portion 15*c* is in contact with the cover wall portion 13*c*.

The stroke arm portion 15*b* is inserted in the handle opening portion 10*c* and the frame-side handle opening portion 13*b*. A bent portion 15*j* formed at the edge of the stroke arm portion 15 is engaged with a known bell crank 16 so that the stroke arm portion 15*b* can pivotally rotate within the predetermined range.

As described above, the handle portion 12 is pivotally connected to the handle frame 13 with respect to the side of the hinge arm portion 15*a* (the convex portion 15*c*) within the predetermined range which is set by the bent portion 15*j* engaging the bell crank 16.

Figure 1:
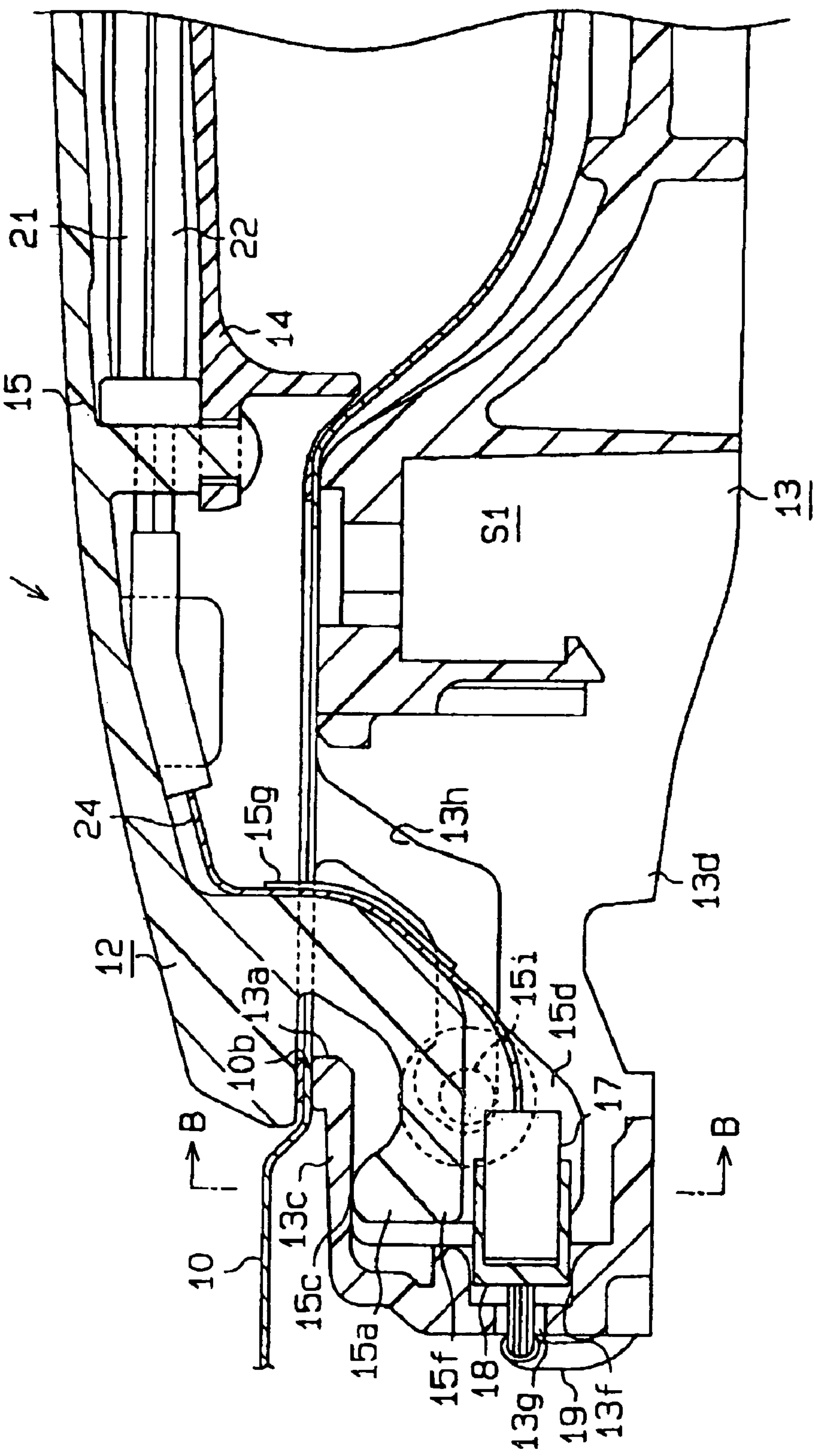
FIG. 1 shows a partial cross sectional view of an outside handle according to an embodiment of the present invention.
Figure 2:
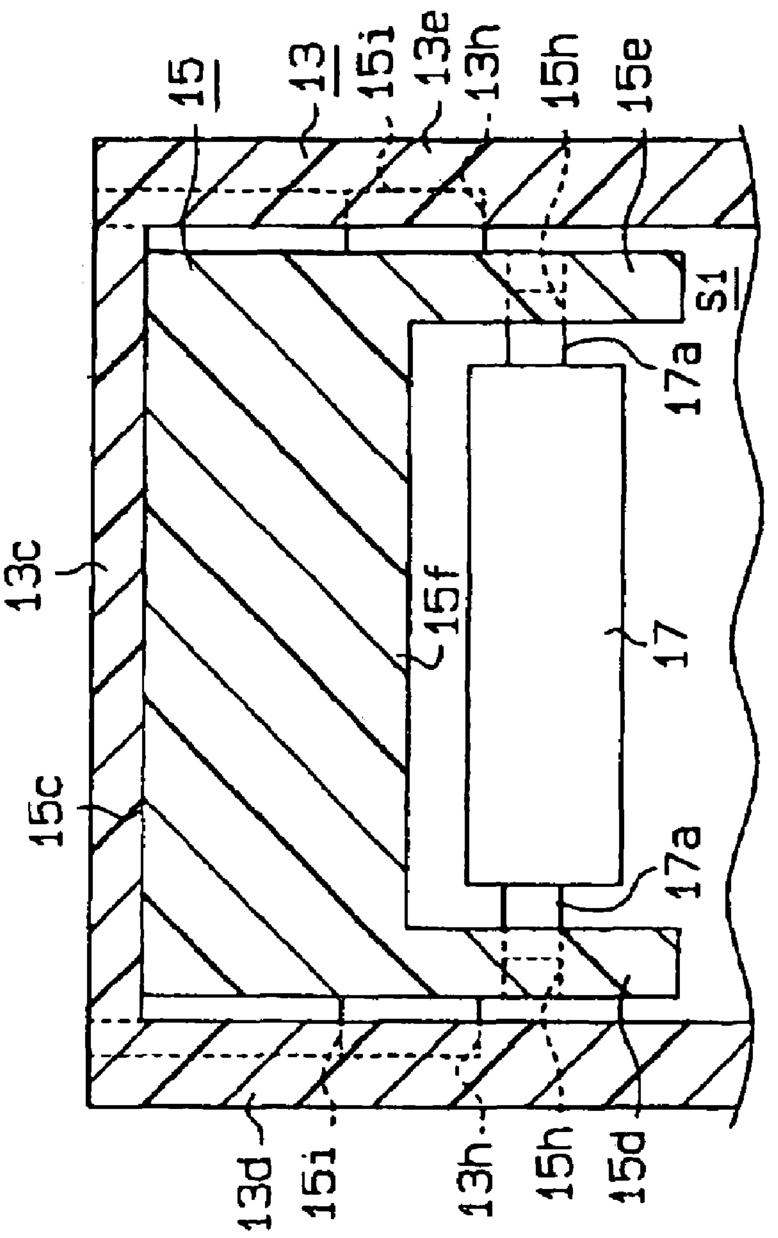
FIG. 2 shows a cross sectional view taken along the line B—B of FIG. 1.

As illustrated in FIG. 2, guiding grooves 13*h* are formed on side wall portions 13*d* and 13*e* of the handle frame 13 forming the first internal space S1 (and the second internal space S2). The guiding grooves 13*h* are provided along the assembling direction of the hinge arm portion 15*a* (the handle portion 12) so so as to extend along the assembling direction from the frame side handle opening portion 13*a* to the bottom side of the handle frame 13(the bottom in FIG. 1). Then, the guiding grooves 13*h* are bent in a longitudinal direction of the side wall portions 13*d* and 13*e*. The hinge arm portion 15*a* includes side wall portions 15*d* and 15*e* extending to the bottom side of the handle frame 13(the lower side in FIG. 1). The hinge arm portion portion 15*a* further includes a cover wall portion 15*f*. A pair of protrusions 15*i* is formed on the side wall portions 15*d* and 15*e* respectively and project in a opposite directions (the right and left side in FIG. 2). As described later, when the handle portion 12 is assembled to the handle frame 13, the protrusions 15*i* are engaged with the above-described guiding grooves 13*h*, and then the handle portion 12 is assembled to a predetermined position along the guiding grooves 13*h* (that is, the assembling direction). When the handle portion 12 is located at the predetermined position, the handle portion 12 is pivotally connected to the handle frame 13 within the predetermined range.

In the handle portion 12, an internal space S3 of the handle portion 12 surrounded by the handle base 14 and the handle cover 15 is provided. In the internal space S3, a transmitting antenna 21, a door locking sensor 22 and a door unlocking switch 23 are accommodated. The transmitting antenna 21, door locking sensor 22 and door unlocking switch 23 are the electric components for the system which enhances convenience for opening and closing the vehicle door.

The transmitting antenna 21 transmits a certification request signal to a portable station carried by a user operating the door opening and closing operation. The door locking sensor 22 detects a variation of capacitance when the user touches (approaches) the handle portion 12. The door unlocking switch 23 is a manual switch used for door opening and closing operation. The door unlocking switch 23 is provided with a switch button 23*a* and a detecting portion 23*b*. The switch button 23*a* is provided at the handle cover 15. The detecting portion 23*b* is provided at the handle base 14 corresponding to the switch button 23*a* When the switch button 23*a* is pushed, the detecting portion 23*b* outputs a signal. In response to the signal, a door unlocking operation is performed. Each electrical wire extending from the transmitting antenna 21, the door unlocking sensor 22 and the door unlocking switch 23 are connected to an FFC 24(Flexible Flat Cable). The FFC 24 is led along the hinge arm portion 15*a* and functions as electrical wires in the handle portion 12. The FFC 24 is electrically connected to electrical wires in the vehicle (the handle frame 13).

Next, the following description will be given for explaining a manner of electrical connection between the FFC 24 provided the handle portion 12 and the electrical wires provided in the vehicle body side (the handle frame 13 side).

In the hinge arm portion 15*a*, guiding parts 15*g* are provided so as to project in each direction which crosses at right angles as viewed in FIG. 1. The FFC 24 is led to the outside along the hinge arm portion 15*a* and supported with both lateral sides being supported by the guiding parts 15*g*.

As illustrated in FIG. 2, a bearing 15*h* is formed near the protrusions 15*i* of the hinge arm portion 15*a* so as to be extended through the side wall portions 15*d* and 15*e* and a box-shaped connector 17 (first connecting portion) made of resin is supported by the hinge arm portion 15*a*. That is, the connector 17 is integrally provided with a shaft portion 17*a* which projects corresponding to the bearing 15*h*. The shaft portion 17*a* is inserted in the bearing 15*h*, and then the connector 17 is rotatably supported by the hinge arm 15*a*. In the connector 17, each wire in FFC 24 is embedded.

As illustrated in FIG. 1, the connector 17 is assembled to a box-shaped connector holder 18 (second connecting portion) formed so as to correspond to the connector 17. The connector holder 18 is provided with terminals which are electrically connected to each wire embedded in the connector 17. When the connector 17 is assembled to the connector holder 18, the terminals provided in the connector holder 18 are surely electrically connected to each wire embedded in the connector 17. Each terminal provided in the connector holder 18 is electrically connected to the electrical wire in the vehicle body side via a cable 19.

The connector holder 18 is loosely inserted into a concave portion 13*f* which is formed in the handle frame 13 at a wall portion facing to the hinge arm portion 15*a*. Accordingly, the connector holder 18 assembled to the connector 17 is provided so as to be pivotally rotatable relative to the handle frame 13 and so as to be pivotally rotatable together with the connector 17 relative to the hinge arm 15*a*. Furthermore, the cable 19 is inserted into an insertion hole 13*g* which extends an approximately central part of the concave portion 13*f*, and then connected to each terminal of the connector holder 18.

Figure 4:
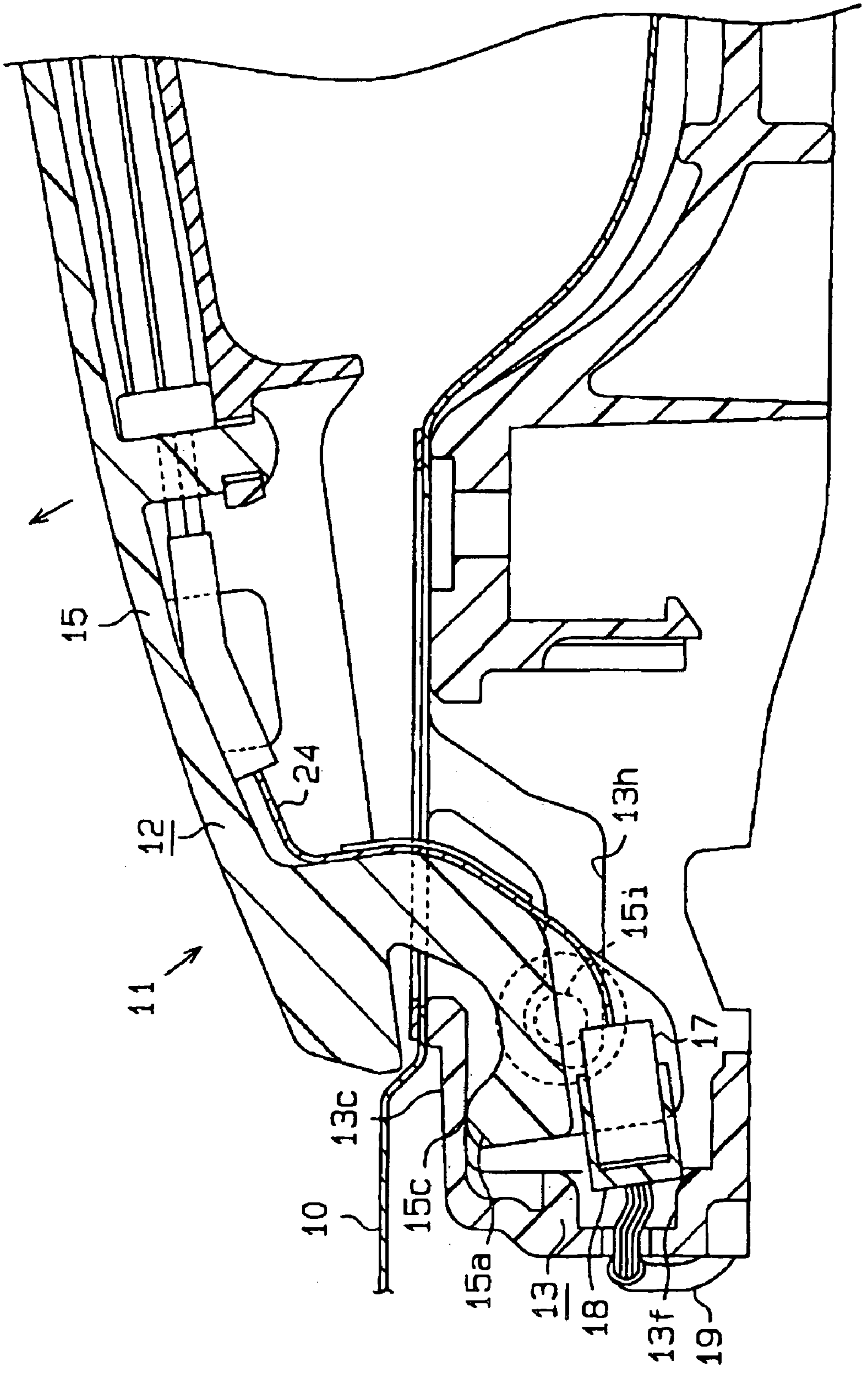
FIG. 4 shows a cross sectional view of the outside handle in which a handle portion is operated relative to a handle frame.
Figure 5:
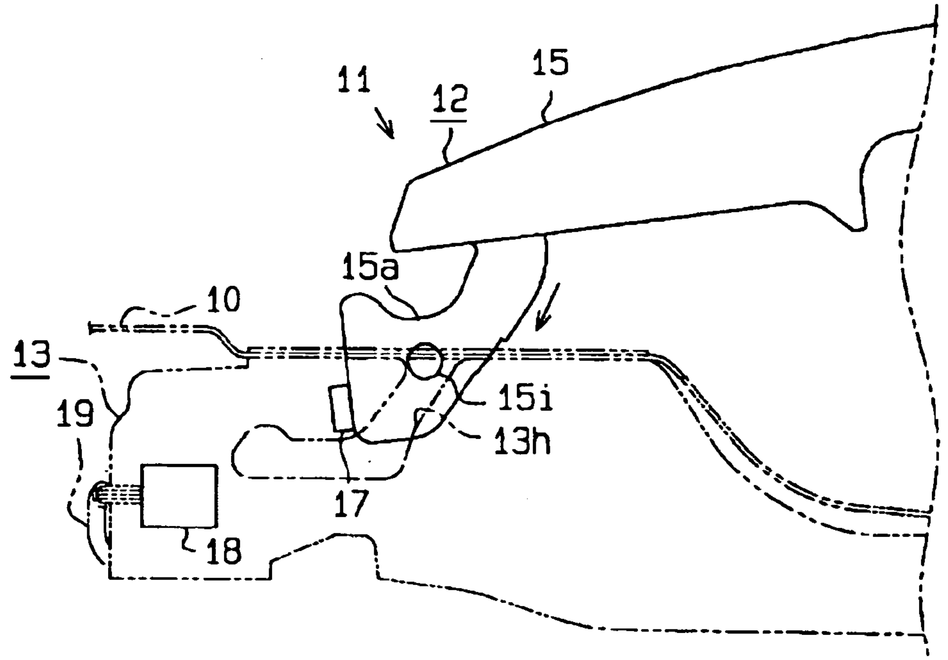
FIG. 5 shows a cross sectional view of the outside handle for illustrating an assembling process in which the handle portion is assembled to the handle frame.

FIG. 4 illustrates the handle portion 12 which has been maximally rotated by an external force from a normal state (shown in FIG. 1) to a full stroke state within the predetermined range. In this case, the connector 17 and the connector holder 18 are pivotally rotatable relative to the handle frame 13, and further rotatable relative to the hinge arm portion 15*a*. Therefore, even if the handle portion 12 is rotated, the connector 17 and the connector holder 18 do not interfere with the handle frame 13, and then the electrical connection between the connector 17 and the connector holder 18 is surely maintained. Then, the electrical connection between the FFC 24 in the handle side and the cable 19 in the vehicle body side is surely maintained via the connector 17 and the connector holder 18. When the handle portion 12 is returned from the full stroke state to the normal state (shown in FIG. 1) after the external force is released, the electrical connection is surely maintained as it is with the foregoing case.

FIGS. 5 to 8 illustrates an assembling process in which the handle portion 12 is inserted into the handle frame 13. As illustrated FIG. 5, initially, the connector holder 18 is temporarily assembled to a predetermined position so as to be loosely inserted in the concave portion 13*f*. The connector 17 is temporarily assembled to a predetermined position so that the front edge of the hinge arm 15*a* can project from the front edge of the hinge arm 15*a*. In this case, the connector 17 is supported by the connector holder 18 with a frictional force between the connector 17 and the connector holder 18. Then, in the frame-side handle opening portion 13*a*, the protrusions 15*i* of the hinge arm portion 15*a* are set to the guiding grooves 13*h*. The protrusions 15*i* of the hinge arm portion 15*a* are inserted in the frame-side handle opening portion 13*a* so that the protrusions 15*i* of the hinge arm 15 can engage with the guiding grooves 13*h* of the handle frame 13.

Figure 6:
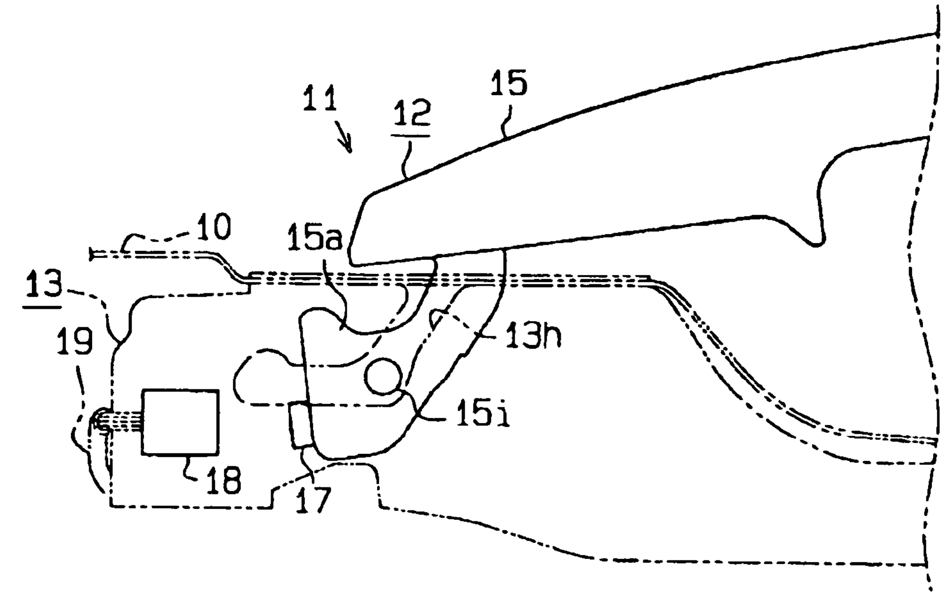
FIG. 6 shows a cross sectional view of the outside handle for illustrating another assembling process in which the handle portion is assembled to the handle frame.
Figure 7:
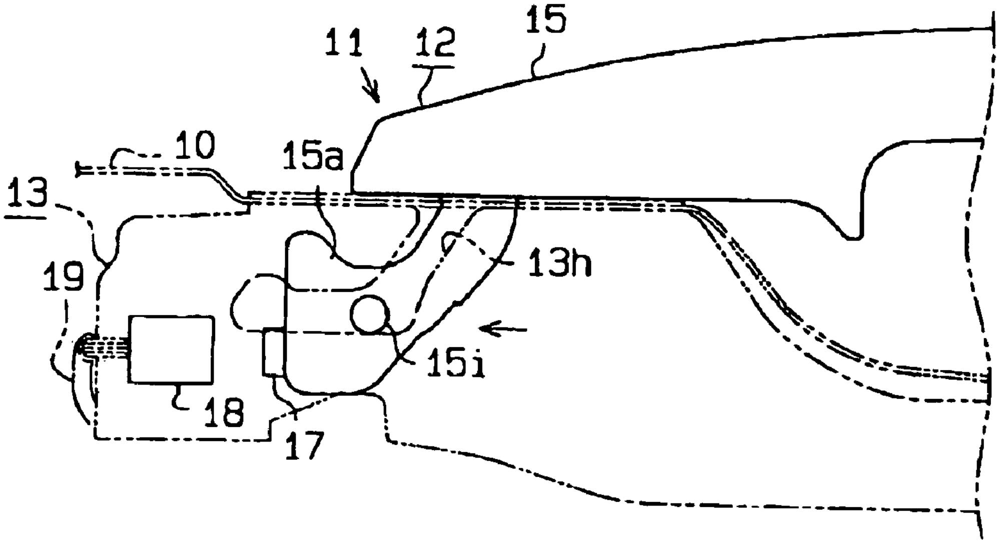
FIG. 7 shows a cross sectional view of the outside handle for illustrating further assembling process in which the handle portion is assembled to the handle frame.
Figure 8:
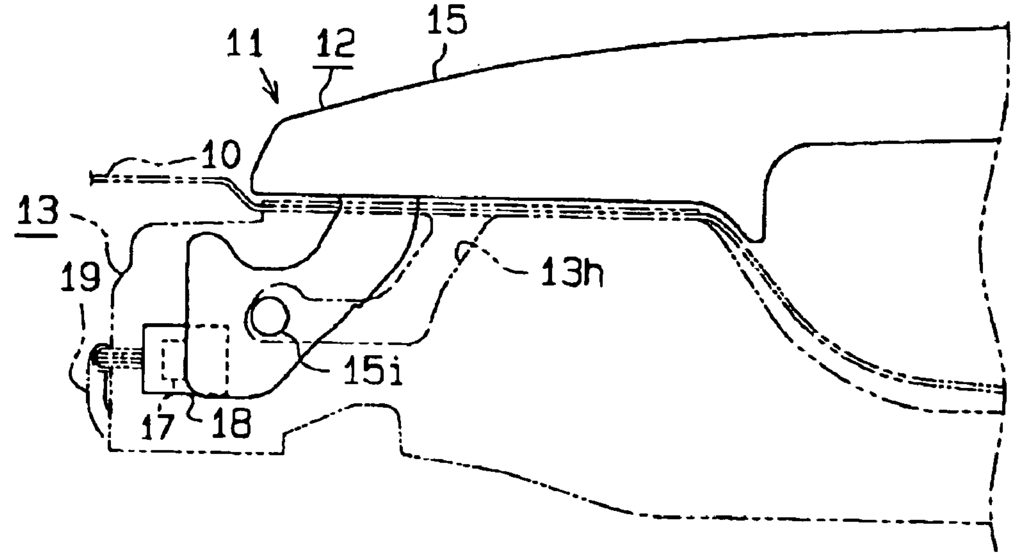
FIG. 8 shows a cross sectional view of the outside handle for illustrating still further assembling process in which the handle portion is assembled to the handle frame.

Next, as illustrated in FIG. 6, the handle portion 12 is moved to a bended edge of the guiding grooves 13*h* via the protrusions 15*i*. By this movement, the hinge arm portion 15*a* is inserted in the handle frame 13 from the handle opening portion 10*b* and the frame-side handle opening portion 13*a* (see FIG. 1). Under this condition, the stroke arm portion 15*b* is inserted in the handle frame 13 from the handle opening portion 10*c* and the frame-side handle inserting portion 13*b* (see FIG. 3). When the handle portion 12 is further moved along the guiding grooves 13*h* as illustrated in FIG. 7, the protrusions 15*i* are displaced at:the rear anchor of the guiding grooves 13*h* bending in a longitudinal direction of the side wall portions 13*d* and 13*e* (forward of the vehicle). In this case, the connector 17 is moved relative to the connector holder 18 so as to concentrically face toward the connector holder 18. As illustrated in FIG. 8, the handle portion 12 is further moved along the guiding grooves 13*h* via the protrusions 15*i*. The hinge arm portion 15*a* is further inserted toward the cover wall portion 13*c*. In this case, since the connector holder 18 is provided in the concave portion 13*f*, axial movement of the connector holder 18 is restricted, and then the connector 17 concentrically provided relative to the connector holder 18 is surely and electrically connected with the connector holder 18. That is, the handle portion 12 is guided via the guiding grooves 13*h* and the protrusions 15*i* engaged with the guiding grooves 13*g*, after the hinge arm portion 15*a* (the stroke arm portion 15*b*) is inserted in the handle frame 13 via the frame-side handle opening portion 13*a*, the hinge arm 15*a* is finally assembled along a direction in which the connector 17 is engaged with the connector 18.

As described above, the following advantages will be given according to the embodiment of the present invention.

According to the embodiment of the present invention, when the handle portion 12 supports the handle frame 13, the assembling direction along which the handle portion 12 is assembled to the handle frame 13 is provided by the guiding grooves 13*h* and the protrusions 15*i* engaged with the guiding grooves 13*h*. Thus the handle portion 12 is smoothly set to be supported by the handle frame 13 at the predetermined position along the assembling direction. The handle portion 12 can be provided and supported at the predetermined position, and then a design allowance of the handle portion 12 can be improved regardless of the handle type. Furthermore, a misalignment of the handle portion 12 relative to the predetermined position can be reduced by assembling the hinge arm portion 15*a* to the handle frame 13 along the assembling direction of the hinge arm portion 15*a*. Accordingly, looseness and twist generated by the misalignment can be reduced, and operation feeling can be improved.

According to the embodiment of the present invention, the assembling direction of the hinge arm 15*a* is designated by simple structure forming by the guiding grooves 13*h* and the protrusions 15*i*.

According to the embodiment of the present invention, the connector 17 can be smoothly and electrically connected to the connector holder 18 by assembling the hinge arm portion 15*a* to the handle frame 13 along the assembling direction. The connector 17 is connected to the hinge arm portion 15*a* so as to be pivotally movable relative to the hinge arm 15*a*. In other words, the connector 17 is rotatably supported by the side wall portions 15*a* and 15*e* of the hinge arm portion 15*a*. Thus, the connector 17 is electrically connected to the connector holder 18 so that manufacturing difference and assembling difference can be absorbed. Especially, even if the assembling direction of the hinge arm 15*a* mainly consists of two directions as described in the embodiment, the hinge arm 15*a* is assembled along the assembling direction without problems, and then the connector 17 is surely and electrically connected to the connector holder 18. The connector 17 is inserted and electrically connected to the connector holder 18 surely.

According to the embodiment of the present invention, the connector 17 is surrounded by the hinge arm 15*a* via the internal surface which is formed by the side wall portions 15*d*, 15*e* and cover wall portion 15*f*, and the shaft portion 17*a* corresponding to rotational axis is provided within the internal surface so as not to project to the outside of the hinge arm 15*a*. Thus, for example, when the hinge arm portion 15*a* is assembled to the handle frame 13, the connector 17 does not interfere with other members (the outer panel 10 and all), and electrical performance of the connector 17 can be maintained.

Additionally, an embodiment of the present invention is not limited to above-described preferred embodiment. The following change may be applied. According to the above-described embodiment, the hinge arm 15*a* includes the protrusions 15*i* and the handle frame 13 includes the guiding grooves 13*h*. However the hinge arm portion 15*a* may include a guiding grooves portion (an engaged means) and the handle frame 13 may include a protrusions portion (an engaging means).

In the above-described embodiment, electrical components accommodated in the handle portion may be changed in response to a door opening and closing function. That is, the electrical components may be changed in response to a system provided in the vehicle door (an E-Latch System and Smart Entry System).

Alternatively, the outside handle device may include the handle portion in which electrical component is not accommodated.

According to the above-described embodiment, a fixed type of handle portion is employed in the outside handle. However, an unfixed type of handle portion may be employed in the outside handle.

The principles, preferred embodiments and mode of operation of the present invention have been described in the foregoing specification. However, the invention which is intended to be protected is not to be construed as limited to the particular embodiments disclosed. Further, the embodiments described herein is to be regarded as illustrative rather than restrictive. Variations and changes may be made by others, and equivalents employed, without departing form the spirit of the present invention. Accordingly, it is expressly intended that all such variations, changes and equivalents which fall within the spirit and scope of the present invention as defined in the claims, be embraced thereby.

The invention claimed is:

1. An outside handle device comprising:

a handle frame provided inside a vehicle door a handle portion located outside the vehicle door, the handle portion comprising an arm portion possessing a distal end;

the arm portion of the handle portion extending into the handle frame, with the distal end of the arm portion contacting the handle frame at a position about which the handle portion rotates when the handle portion is rotated to open the vehicle door; and first and second members provided at the arm portion of the handle portion and the handle frame, respectively, the first member being located at a location different from the distal end of the arm portion, the second member being in sliding engagement with the first member to define a path of extension of the handle frame, wherein an electrical component is accommodated in the handle portion, a first connecting element is pivotably mounted on the arm portion and is electrically connected to the electrical component, and a second connecting element is provided at the handle frame and is in electrical engagement with the first connecting element.

2. An outside handle device according to claim 1, wherein the first member is one of a pin and a groove, while the second member is the other of the pin and the groove.

3. An outside handle device according to claim 1, wherein the first connecting element is at least partially surrounded by an internal surface of the arm portion.

4. An outside handle device according to claim 1, wherein the electrical component is an antenna.

5. An outside handle device according to claim 1, wherein the electrical component is a sensor for door-unlocking operation.

6. An outside handle device according to claim 1, wherein the electrical component is a door-locking switch.

7. An outside handle device according to claim 1, wherein the first connecting element is a connector.

8. An outside handle device according to claim 1, wherein the first connecting element is a connector holder.

* * * * *